United States Patent [19]

Ishii et al.

[11] Patent Number: 4,976,521
[45] Date of Patent: Dec. 11, 1990

[54] ZOOM LENS SYSTEM

[75] Inventors: Atsujiro Ishii; Tsutomu Uzawa, both of Tokyo, Japan

[73] Assignee: Olympus Optical Co., Ltd., Tokyo, Japan

[21] Appl. No.: 395,806

[22] Filed: Aug. 18, 1989

[30] Foreign Application Priority Data

Aug. 19, 1988 [JP] Japan .................... 63-204580

[51] Int. Cl.$^5$ .......................................... G02B 15/177
[52] U.S. Cl. ..................................... 350/423; 350/413; 350/426
[58] Field of Search .................... 350/426, 413, 423

[56] References Cited

FOREIGN PATENT DOCUMENTS 0231517 10/1986 Japan ........................ 350/413
61-231517 10/1986 Japan .
61-248015 11/1986 Japan .
62-153909 7/1987 Japan .

Primary Examiner—Bruce Y. Arnold
Assistant Examiner—Rebecca D. Gass
Attorney, Agent, or Firm—Cushman, Darby & Cushman

[57] ABSTRACT

A zoom lens system comprising a first lens unit having negative refractive power and a second lens unit having positive refractive power, so adapted as to change focal length thereof by varying the airspace reserved between said first lens unit and said second lens unit, and using at least one radial GRIN lens in said first lens unit. Said zoom lens system comprises a very small number of lens elements, and has distortion and chromatic aberration corrected especially favorably.

8 Claims, 7 Drawing Sheets

ZOOM LENS SYSTEM

BACKGROUND OF THE INVENTION (a) Field of the Invention:

This invention relates to a zoom lens system, in particular to a zoom lens system having favorable corrected aberrations and composed of small number of lens components.

(b) Description of the prior art:

In the conventional zoom lens system consisting of a first lens unit which has negative refractive power, and a second lens unit which has positive refractive power and is movable for varying focal length, the first lens unit comprises two, three or more lens elements for correcting chromatic aberration. In addition, since the offaxial ray passes through a high portion of the first lens unit and height of ray is remarkably varied by changing focal length of the zoom lens system, it is rather difficult to correct lateral chromatic aberration and offaxial aberrations.

SUMMARY OF THE INVENTION

A primary object of the present invention is to provide a zoom lens system having favorably corrected chromatic aberration and offaxial aberrations.

Another object of the present invention is to provide a zoom lens system composed of a very small number of lens elements.

The zoom lens system according to the present invention comprises, in the order from the object side, a first lens unit having negative refractive power and a second lens unit having positive refractive power, and said first lens unit comprises at least one graded refractive index lens (GRIN lens) having such a refractive index distribution as to vary refractive index as the lens portions are farther from the optical axis.

In a zoom lens system consisting of a first lens unit having negative refractive power and a second lens unit having positive refractive power, and so adapted as to vary focal length thereof by varying the airspace reserved between these two lens units, it is usual to compose the first lens unit of three or more lens elements for correcting aberrations.

In the zoom lens system of this type, offaxial aberrations are easily produced due to the fact that the extremely marginal ray passes through a high portion of the first lens unit. Further, the airspace reserved between the first lens unit and the second lens unit is varied remarkably, thereby allowing chromatic aberration to be easily produced. Accordingly, it is difficult to reduce the number of the lens elements and favorably correct aberrations when the zoom lens system is composed only of homogenous lens elements.

The zoom lens system according to the present invention comprises a GRIN lens in the first lens unit as described above. Further, this GRIN lens is designed as the so-called radial GRIN lens whose refractive index varies as the lens portions are farther from the optical axis and has a refractive index distribution expressed by the following formula:

$$n(r) = n_0 + n_1 r^2 + n_2 r^4 + \ldots$$

wherein the reference symbol r represents distance as measured from the optical axis in the radial direction, the reference symbol $n(r)$ designates refractive index at a lens portion located at a radial distance of r from the optical axis, and the reference symbols $n_0$, $n_1$, $n_2$, ... denote the coefficients of 0-th, 2-nd, 4-th, ... order.

Furthermore, the zoom lens system according to the present invention is so designed as to satisfy the following conditions (1) and (2):

(1) $n_1(d) > 0$                                                       (1)

(2) $0.9 > f_I/f_a > -5$                          (2)

wherein the reference symbol $n_1(d)$ represents the value of the refractive index distribution coefficient $n_1$ for the d-line, the reference symbol $f_I$ designates focal length of the first lens unit and the reference symbol $f_a$ denotes focal length of the first lens unit determined on an assumption that the GRIN lens arranged in the first lens unit is replaced with a homogenous lens having the same shape and a refractive index of $n_0$.

A graded refractive index lens has refractive power in the interior of the medium thereof and a power of $-2n_1 D$ for the paraxial ray when thickness of the lens is represented by D. It is therefore possible to impart a negative refractive power to the interior of the GRIN lens by selecting the positive sign for the coefficient $n_1$ as defined by the condition (1). This selection makes it possible to lessen the burden of refractive power on the lens surfaces and enlarge radii of curvature on the lens surfaces while maintaining constant refractive power of the GRIN lens as a whole. Accordingly, the selection makes it possible to favorably correct the negative distortion and the other offaxial aberrations which are easily produced due to the fact that the offaxial ray passes through the high portion of the first lens unit. As is understood from the foregoing description, the condition (1) defines value of $n_1$ so that the interior of the GRIN lens has a negative refractive power and is adopted for correcting the offaxial aberrations.

Moreover, the greatest effect obtained by using the GRIN lens in the zoom lens system according to the present invention is that the GRIN lens has a strong function to correct chromatic aberration in the medium thereof.

The chromatic aberration in a GRIN lens is, when the lens is designed as a single lens element, expressed by the following formula (i):

$$(\phi_s / \nu_0) + (\phi_M / \nu_1) \qquad (i)$$

wherein the reference symbol $\phi_s$ represents refractive power of the lens surface, the reference symbol $\phi_M$ designates refractive power of the medium thereof, and the reference symbols $\nu_0$ and $\nu_1$ denote the values given by the following formulae:

$$\nu_0 = \{n_0(d) - 1\} / \{n_0(F) - n_0(C)\}$$

$$\nu_1 = n_1(d) / \{n_1(F) - n_1(C)\}$$

wherein the reference symbols $n_1(F)$ and $n_1(C)$ represent the values of the coefficient $n_1$ for the F-line and the C-line respectively.

Let us now assume a case where the first lens unit consists of a single GRIN lens. When the refractive power of the surface of the GRIN lens is negative, $\phi_s / \phi_M$ has a negative value. Since $\phi_M$ is negative in the present invention, it is possible to make the value of the formula (i) zero by selecting an adequate value for $\nu_1$. However, since $n_1(d)$ has a positive value as defined by the condition (1), $\{n_1(F)-n_1(C)\}$ must have a negative value for obtaining a negative value of $\nu_1$. When $\{n_1(F)-n_1(C)\}$ has a negative value, Abbe's number of the medium is apt to be abruptly enlarged as the lens portions are farther from the optical axis, whereby Abbe's number is apt to have a value which is not available actually (imaginary design values). In addition, it is relatively difficult to manufacture a GRIN lens having such an Abbe's number as to be abruptly enlarged as refractive index is enlarged.

Further, in a zoom lens system of the same type as the zoom lens system according to the present invention, the offaxial ray passes through a high portion of the first lens unit and aberrations of high orders are easily produced. Moreover, chromatic aberration is varied remarkably by zooming since the airspace reserved between the first lens unit and the second lens unit is varied for zooming. Accordingly, it is difficult to sufficiently correct, by the interior of a medium, all the chromatic aberrations which are produced by the concave surface of the first lens unit at all the lens portions ranging from the optical axis to the extreme margin of the image in all the zooming conditions from the wide position to the tele position, and the chromatic aberrations cannot be corrected sufficiently even by using a positive lens element having high dispersing power.

It is possible to reduce production degree of the chromatic aberrations by strengthening the refractive power $\phi_M$ of the interior of the medium and enlarging radius of curvature on the concave surface of the first lens unit. When the absolute value of the refractive power $\phi_M$ is further enlarged, it is possible to impart all the refractive power of the first lens unit to the interior of the medium and obtain $\phi_s=0$ accordingly. Let us now consider the axial chromatic aberration in this case. Since $\phi_s/\nu_0$ has a value of 0, it is sufficient for zeroing the axial chromatic aberration (for obtaining $\phi_s/\nu_0+\phi_M/\nu_1=0$) to select $\nu_1=\infty$ or $\{n_1(F)-n_1(C)\}\approx 0$. Further, chromatic aberrations of high orders are produced little in this case since the lens surface has a refractive power of 0. Furthermore, when the negative refractive power of the interior of the medium is strengthened, it is possible to select a positive value for the refractive power $\phi_s$ of the lens surface. Since such selection makes $\phi_s/\nu_0$ positive, it is possible to obtain $\phi_s/\nu_0+\phi_M/\nu_1=0$ even when an adequate positive value is selected for $\nu_1$. Since $n_1(F)-n_1(C)$ has a positive value and $n_1(d)$ also has a positive value in this case, Abbe's number varies little between the optical axis and the marginal portion. Moreover, when the graded refractive index lens is combined with a single homogenous lens element, the axial chromatic aberration is expressed by the following formula (ii):

$$\phi_H/\nu_N+\phi_s/\nu_0+\phi_M/\nu_1 \qquad (ii)$$

wherein the reference symbol $\phi_H$ represents refractive power of the homogenous lens element and the reference symbol $\nu_H$ designates Abbe's number of the homogenous lens element.

Since the first lens unit has a negative refractive power as a whole, $\phi_M$ must have a negative value and $\phi_M+\phi_s$ must be smaller than $-\phi_M$ when $\phi_H+\phi_s$ has a positive value. By selecting an adequate positive value for $\nu_1$, it is therefore possible to zero the axial chromatic aberration, or zero the formula (ii) as expressed below:

$$\phi_H/\nu_H+\phi_s/\nu_0+\phi_M/\nu_1=0 \qquad (iii)$$

When value of $\nu_H$ is selected within a range of $\nu_H<-\phi_H\nu_0/(\phi_s+\phi_M)$, the formula (ii) has a positive value as expressed by the following formula (iv):

$$\phi_H/\nu_H+\phi_s/\nu_0+\phi_M/\nu_1>0 \qquad (iv)$$

From the formulae (iii) and (iv) mentioned above, we obtain the following relationship:

$$\phi_M/\nu_0>\phi_M/\nu_1 \qquad (v)$$

Since $\phi_M$ has a positive value, $\nu_1<\nu_0$ is determined from the formula (v). That is to say, the GRIN lens has a refractive index of the medium which is increased as the lens portions are farther from the optical axis toward the margin and an Abbe's number which is decreased as the lens portions are farther from the optical axis toward the margin.

It is easy to manufacture such a GRIN lens as described above since the refractive indices and Abbe's numbers of the currently prepared optical glass materials are distributed in such a trend that the large refractive indices are combined with small Abbe's numbers and small refractive indices are combined with large Abbe's numbers. That is to say, it is possible to correct the chromatic aberration in a lens unit by using an easily manufacturable GRIN lens when said GRIN lens is combined with a homogenous lens element.

In order to correct the chromatic aberration more favorably, it is desirable to design the zoom lens system according to the present invention so as to satisfy the above-mentioned condition (2). If the upper limit of the condition (2) is exceeded, the surface of the first lens unit will have too strong a negative refractive power, thereby allowing the chromatic aberration to be produced. In order to correct the chromatic aberration, it will be necessary to design the GRIN lens so as to have such an Abbe's number as to be enlarged as the lens portions are farther from the optical axis, thereby making it rather hard to correct the aberrations of high orders. If the surface of the first lens unit has a positive refractive power strong enough to exceed the lower limit of the condition (2), the refractive index gradient of the GRIN lens must undesirably be increased for imparting a negative refractive power to the first lens unit.

DETAILED DESCRIPTION OF THE PREFERRED EMBODIMENTS

Figure 1:
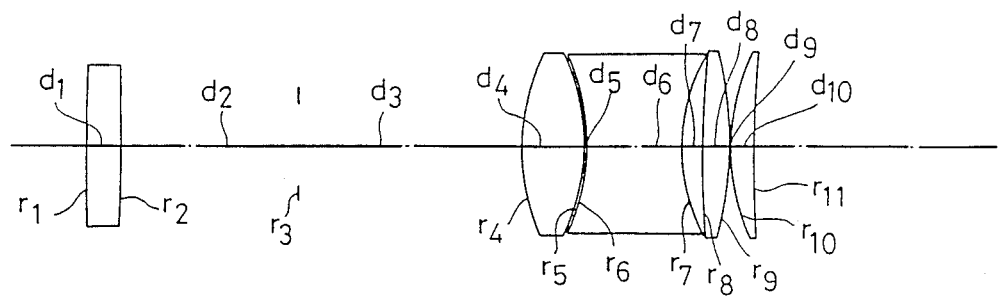
FIG. 1 through FIG. 5 show sectional views illustrating compositions of Embodiments 1 through 5 of the zoom lens system according to the present invention.
Figure 2:
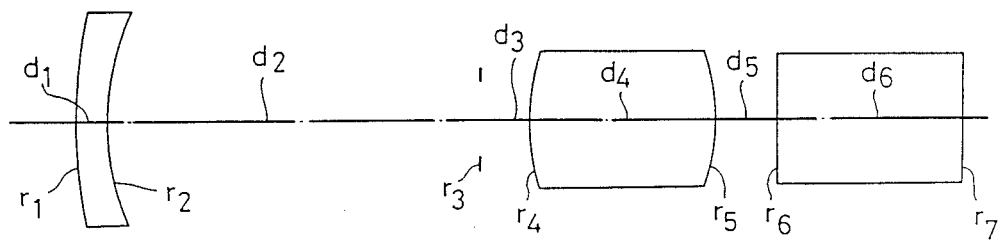
Figure 3:
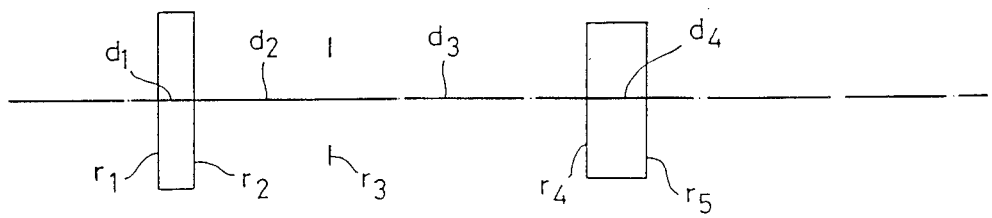
Figure 4:
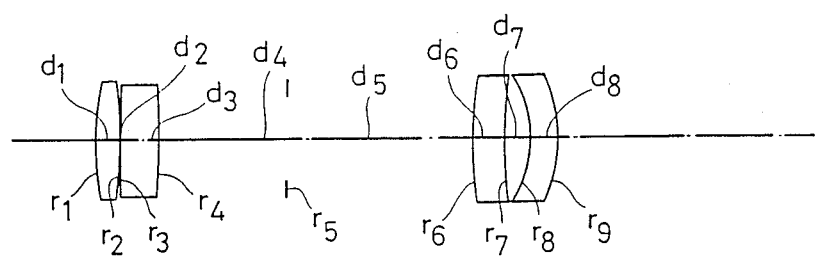
Figure 5:
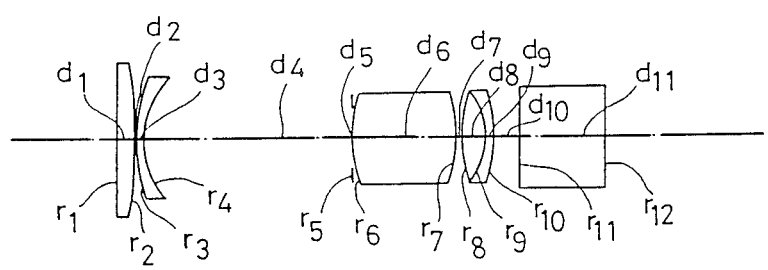

Now the present invention will be described more detailedly with reference to the preferred Embodiments shown in the accompanying drawings and given in the form of the following numerical data:

Embodiment 1

| $f = 12\text{--}36$ mm, | $F/2.8\text{--}F/5.8$ |
| $2\omega = 37°\text{--}13°$, | $f_I/f_a = 0$ |

$r_1 = 9000.0000$
  $d_1 = 2.7724$  $n_{01} = 1.59270$  $\nu_{01} = 35.29$
$r_2 = -9000.0000$
  $d_2 = D_1$
$r_3 = \infty$ (stop)
  $d_3 = D_2$
$r_4 = 17.3581$
  $d_4 = 5.1368$  $n_{02} = 1.73520$  $\nu_{02} = 41.08$
$r_5 = -16.5363$
  $d_5 = 0.2140$
$r_6 = -15.6003$
  $d_6 = 7.9086$  $n_{03} = 1.76182$  $\nu_{03} = 26.55$
$r_7 = 15.1388$
  $d_7 = 2.0000$
$r_8 = 77.5161$
  $d_8 = 2.0000$  $n_{04} = 1.69700$  $\nu_{04} = 48.51$
$r_9 = -32.3826$
  $d = 0.1437$
$r_{10} = 17.5789$
  $d_{10} = 2.0000$  $n_{05} = 1.69680$  $\nu_{05} = 55.52$
$r_{11} = 108.9969$

| f | 12 | 20.5 | 36 |
|---|---|---|---|
| $D_1$ | 14.764 | 1.269 | 1.000 |
| $D_2$ | 18.944 | 12.418 | 0.518 |

GRIN lens ($n_{01}$)

| wavelength | $n_0$ | $n_1$ |
|---|---|---|
| 587.56 | 1.59270 | $0.65208 \times 10^{-2}$ |
| 656.28 | 1.58780 | $0.65156 \times 10^{-2}$ |
| 486.13 | 1.60459 | $0.65331 \times 10^{-2}$ |

| wavelength | $n_2$ | $n_3$ |
|---|---|---|
| 587.56 | $0.13327 \times 10^{-5}$ | $0.20399 \times 10^{-7}$ |
| 656.28 | $0.13327 \times 10^{-5}$ | $0.20399 \times 10^{-7}$ |
| 486.13 | $0.13327 \times 10^{-5}$ | $0.20399 \times 10^{-7}$ |

| wavelength | $n_4$ |
|---|---|
| 587.56 | $-0.29211 \times 10^{-8}$ |
| 656.28 | $-0.29211 \times 10^{-8}$ |
| 486.13 | $-0.29211 \times 10^{-8}$ |

Embodiment 2

| $f = 9.5\text{--}19$ mm, | $F/2.8\text{--}F/3.3$ |
| $2\omega = 48°\text{--}25°$, | $f_I/f_a = 0.4$ |

$r_1 = 40.4945$
  $d_1 = 2.5444$  $n_{01} = 1.60342$  $\nu_{01} = 38.01$
$r_2 = 22.3650$
  $d_2 = D_1$
$r_3 = \infty$ (stop)
  $d_3 = D_2$
$r_4 = 20.9069$
  $d_4 = 15.7046$  $n_{02} = 1.69700$  $\nu_{02} = 48.51$
$r_5 = -15.8097$
  $d_5 = D_3$
$r_6 = \infty$
  $d_6 = 15.5000$  $n_{03} = 1.51633$  $\nu_{03} = 64.15$
$r_7 = \infty$

| f | 9.5 | 12 | 19 |
|---|---|---|---|
| $D_1$ | 31.340 | 19.367 | 4.115 |
| $D_2$ | 4.231 | 3.153 | 0.132 |
| $D_3$ | 5.106 | 6.184 | 9.205 |

GRIN lens ($n_{01}$)

| wavelength | $n_0$ | $n_1$ |
|---|---|---|
| 587.56 | 1.60342 | $0.30000 \times 10^{-2}$ |
| 656.28 | 1.59875 | $0.30180 \times 10^{-2}$ |
| 486.13 | 1.61462 | $0.29580 \times 10^{-2}$ |

| wavelength | $n_2$ |
|---|---|
| 587.56 | $-0.64816 \times 10^{-5}$ |
| 656.28 | $-0.64814 \times 10^{-5}$ |
| 486.13 | $-0.64821 \times 10^{-5}$ |

GRIN lens ($n_{02}$)

| wavelength | $n_0$ | $n_1$ |
|---|---|---|
| 587.56 | 1.69700 | $0.69498 \times 10^{-4}$ |
| 656.28 | 1.69268 | $0.54606 \times 10^{-4}$ |
| 486.13 | 1.70705 | $0.10425 \times 10^{-3}$ |

| wavelength | $n_2$ | $n_3$ |
|---|---|---|
| 587.56 | $0.66135 \times 10^{-5}$ | $-0.62149 \times 10^{-7}$ |
| 656.28 | $0.66137 \times 10^{-5}$ | $-0.61900 \times 10^{-7}$ |
| 486.13 | $0.66130 \times 10^{-5}$ | $-0.62730 \times 10^{-7}$ |

Embodiment 3

| $f = 12\text{--}36$ mm, | $F/2.6\text{--}F/5.4$ |
| $2\omega = 37°\text{--}13°$, | $f_I/f_a = 0$ |

$r_1 = 9000.0000$
  $d_1 = 3.0005$  $n_{01} = 1.59270$  $\nu_{01} = 35.29$
$r_2 = -9000.0000$
  $d_2 = D_1$
$r_3 = \infty$ (stop)
  $d_3 = D_2$
$r_4 = -9000.0000$
  $d_4 = 5.0284$  $n_{02} = 1.80518$  $\nu_{02} = 25.43$
$r_5 = 9000.0000$

| f | 12 | 20.5 | 36 |
|---|---|---|---|
| $D_1$ | 11.304 | 0.786 | 2.343 |
| $D_2$ | 21.645 | 15.106 | 3.181 |

GRIN lens ($n_{01}$)

| wavelength | $n_0$ | $n_1$ |
|---|---|---|
| 587.56 | 1.59270 | $0.65208 \times 10^{-2}$ |
| 656.28 | 1.58780 | $0.65156 \times 10^{-2}$ |
| 486.13 | 1.60459 | $0.65331 \times 10^{-2}$ |

| wavelength | $n_2$ | $n_3$ |
|---|---|---|
| 587.56 | $0.44466 \times 10^{-6}$ | $0.20399 \times 10^{-7}$ |
| 656.28 | $0.44466 \times 10^{-6}$ | $0.20399 \times 10^{-7}$ |
| 486.13 | $0.44466 \times 10^{-6}$ | $0.20399 \times 10^{-7}$ |

| wavelength | $n_4$ |
|---|---|
| 587.56 | $-0.29211 \times 10^{-8}$ |
| 656.28 | $-0.29211 \times 10^{-8}$ |
| 486.13 | $-0.29211 \times 10^{-8}$ |

GRIN lens ($n_{02}$)

| wavelength | $n_0$ | $n_1$ |
|---|---|---|
| 587.56 | 1.80518 | $-0.52463 \times 10^{-2}$ |
| 656.28 | 1.79609 | $-0.52448 \times 10^{-2}$ |
| 486.13 | 1.82775 | $-0.52498 \times 10^{-2}$ |

| wavelength | $n_2$ | $n_3$ |
|---|---|---|
| 587.56 | $0.10666 \times 10^{-5}$ | $-0.24294 \times 10^{-8}$ |
| 656.28 | $0.10666 \times 10^{-5}$ | $-0.24294 \times 10^{-8}$ |
| 486.13 | $0.10666 \times 10^{-5}$ | $-0.24294 \times 10^{-8}$ |

| wavelength | $n_4$ |
|---|---|
| 587.56 | $0.52504 \times 10^{-10}$ |
| 656.28 | $0.52504 \times 10^{-10}$ |
| 486.13 | $0.52504 \times 10^{-10}$ |

Embodiment 4

| $f = 12\text{--}36$ mm, | $F/2.6\text{--}F/4.8$ |
| $2\omega = 37°\text{--}13°$, | $f_I/f_a = 1.84$ |

-continued

Embodiment 4

$r_1 = 24.9034$
  $d_1 = 2.0000$    $n_{01} = 1.92286$    $\nu_{01} = 20.88$
$r_2 = -34.4191$
  $d_2 = 0.1000$
$r_3 = -321.5953$
  $d_3 = 3.1608$    $n_{02} = 1.56444$    $\nu_{02} = 43.79$
$r_4 = -73.7884$
  $d_4 = D_1$
$r_5 = \infty$ (stop)
  $d_5 = D_2$
$r_6 = 36.8051$
  $d_6 = 2.5655$    $n_{03} = 1.80518$    $\nu_{03} = 25.43$
$r_7 = 33.8037$
  $d_7 = 2.0000$
$r_8 = -10.5668$
  $d_8 = 2.5424$    $n_{04} = 1.80518$    $\nu_{04} = 25.43$
$r_9 = -12.3179$

| f | 12 | 20.5 | 36 |
|---|---|---|---|
| $D_1$ | 10.510 | 0.008 | 0.018 |
| $D_2$ | 15.786 | 10.527 | 0.935 |

| GRIN lens ($n_{02}$) | | |
|---|---|---|
| wavelength | $n_0$ | $n_1$ |
| 587.56 | 1.56444 | $0.17906 \times 10^{-1}$ |
| 656.28 | 1.56061 | $0.17715 \times 10^{-1}$ |
| 486.13 | 1.57350 | $0.18354 \times 10^{-1}$ |

| wavelength | $n_2$ |
|---|---|
| 587.56 | $0.36336 \times 10^{-4}$ |
| 656.28 | $0.36336 \times 10^{-4}$ |
| 486.13 | $0.36336 \times 10^{-4}$ |

| GRIN lens ($n_{03}$) | | |
|---|---|---|
| wavelength | $n_0$ | $n_1$ |
| 587.56 | 1.80518 | $-0.94830 \times 10^{-2}$ |
| 656.28 | 1.79609 | $-0.94685 \times 10^{-2}$ |
| 486.13 | 1.82775 | $-0.95169 \times 10^{-2}$ |

| wavelength | $n_2$ |
|---|---|
| 587.56 | $0.78062 \times 10^{-5}$ |
| 656.28 | $0.78062 \times 10^{-5}$ |
| 486.13 | $0.78062 \times 10^{-5}$ |

| GRIN lens ($n_{04}$) | | |
|---|---|---|
| wavelength | $n_0$ | $n_1$ |
| 587.56 | 1.80518 | $-0.48848 \times 10^{-2}$ |
| 656.28 | 1.79609 | $-0.48779 \times 10^{-2}$ |
| 486.13 | 1.82775 | $-0.49008 \times 10^{-2}$ |

| wavelength | $n_2$ |
|---|---|
| 587.56 | $0.69893 \times 10^{-5}$ |
| 656.28 | $0.69893 \times 10^{-5}$ |
| 486.13 | $0.69893 \times 10^{-5}$ |

Embodiment 5 f = 8-16 mm,    F/1.9-F/2.6
$2\omega = 26.6°-14°$,    $f_I/f_a = 0.81$ $r_1 = -688.3714$
  $d_1 = 2.7517$    $n_{01} = 1.84666$    $\nu_{01} = 23.88$
$r_2 = 304.5663$
(aspherical surface)
  $d_2 = 0.2000$
$r_3 = 31.8048$
  $d_3 = 1.2007$    $n_{02} = 1.77250$    $\nu_{02} = 49.66$
$r_4 = 14.8482$
  $d_4 = D_1$
$r_5 = \infty$ (stop)
  $d_5 = 0$
$r_6 = 23.4433$
(aspherical surface)
  $d_6 = 17.7962$    $n_{03} = 1.51633$    $\nu_{03} = 64.15$
$r_7 = -27.3871$
  $d_7 = D_2$
$r_8 = 28.5543$
  $d_8 = 4.0890$    $n_{04} = 1.60311$    $\nu_{04} = 60.70$ -continued

Embodiment 5

$r_9 = -10.0297$
  $d_9 = 1.3427$    $n_{05} = 1.84666$    $\nu_{05} = 23.88$
$r_{10} = -21.9487$
  $d_{10} = D_3$
$r_{11} = \infty$
  $d_{11} = 14.5000$    $n_{06} = 1.51633$    $\nu_{06} = 64.15$
$r_{12} = \infty$

| f | 8 | 11.3 | 16 |
|---|---|---|---|
| $D_1$ | 35.092 | 25.441 | 15.453 |
| $D_2$ | 0.819 | 11.289 | 20.456 |
| $D_3$ | 4.018 | 3.210 | 4.031 |

| GRIN lens ($n_{02}$) | | |
|---|---|---|
| wavelength | $n_0$ | $n_1$ |
| 587.56 | 1.77250 | $0.30000 \times 10^{-2}$ |
| 656.28 | 1.76780 | $0.30180 \times 10^{-2}$ |
| 486.13 | 1.78336 | $0.29580 \times 10^{-2}$ |

| wavelength | $n_2$ |
|---|---|
| 587.56 | $0.24947 \times 10^{-7}$ |
| 656.28 | $-0.22452 \times 10^{-6}$ |
| 486.13 | $0.60703 \times 10^{-6}$ | aspherical surface coefficients
(2nd surface)

$E = -0.81773 \times 10^{-4}$,    $F = 0.57310 \times 10^{-6}$
$G = -0.20374 \times 10^{-8}$ (6th surface)

$E = -0.47973 \times 10^{-4}$,    $F = 0.13884 \times 10^{-5}$
$G = -0.24428 \times 10^{-7}$ wherein the reference symbols $r_1$, $r_2$, ... represent radii of curvature on the surfaces of the respective lens elements, the reference symbols $d_1$, $d_2$, ... designate thicknesses of the respective lens elements and airspaces reserved therebetween, the reference symbols $n_{01}$, $n_{02}$, ... denote refractive indices of the respective lens elements, and the reference symbols $\nu_{01}$, $\nu_{02}$, ... denote Abbe's numbers of the respective lens elements. The Abbe's numbers of the GRIN lenses are represented as those measured on the optical axis.

Figure 6:
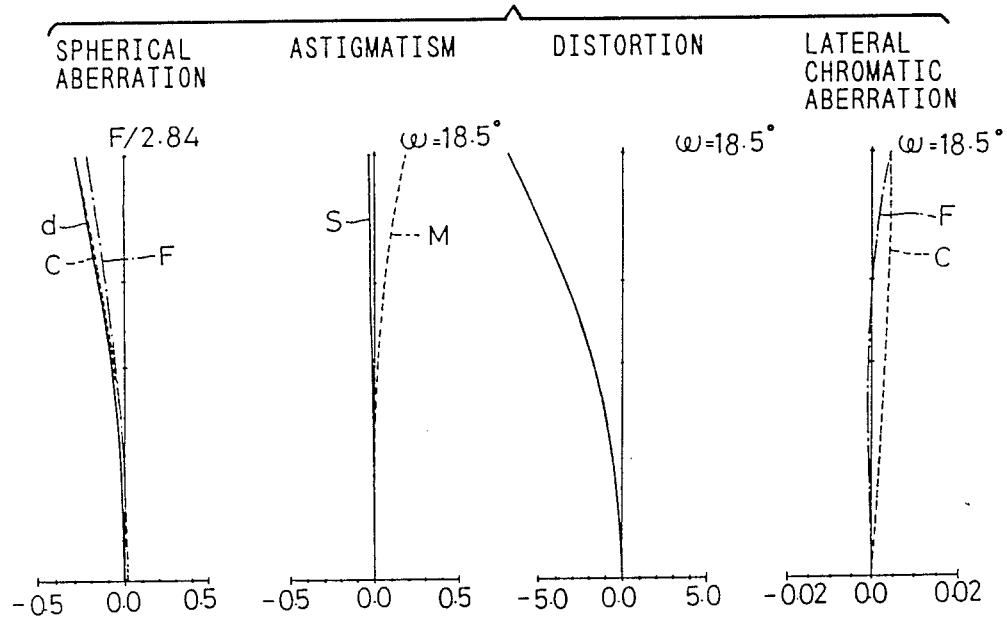
FIG. 6 and FIG. 7 show curves illustrating aberration characteristics of the Embodiment 1 of the present invention.
Figure 7:
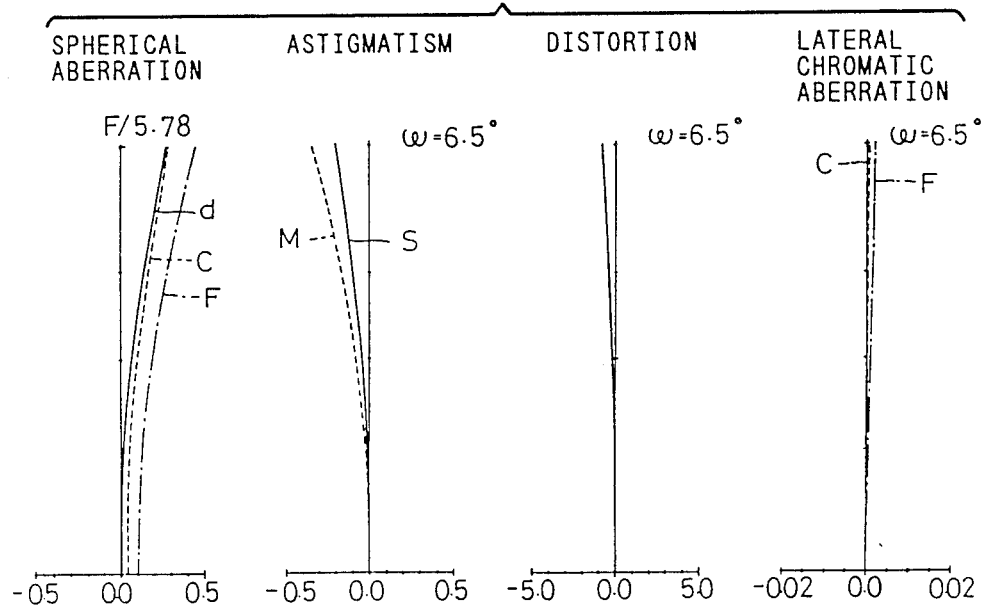

The Embodiment 1 comprises a first lens unit which is composed of a GRIN lens having a negative refractive power and nearly planar surfaces which are nearly parallel with each other. Aberration characteristics at the wide position and the tele position of the Embodiment 1 are illustrated in FIG. 6 and FIG. 7 respectively.

Figure 8:
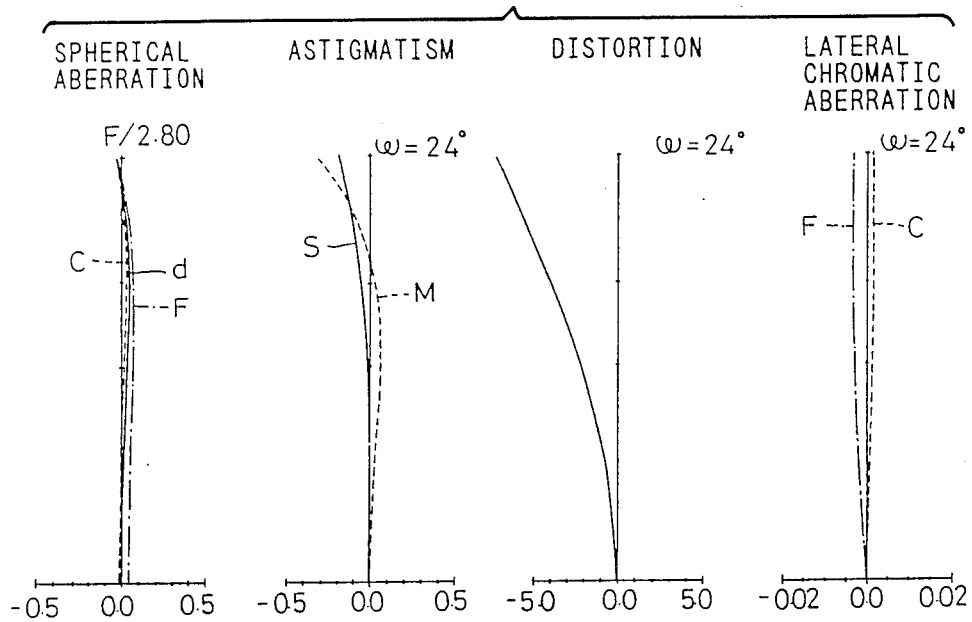
FIG. 8 and FIG. 9 show curves illustrating aberration characteristics of the Embodiment 2 of the present inveniton.
Figure 9:
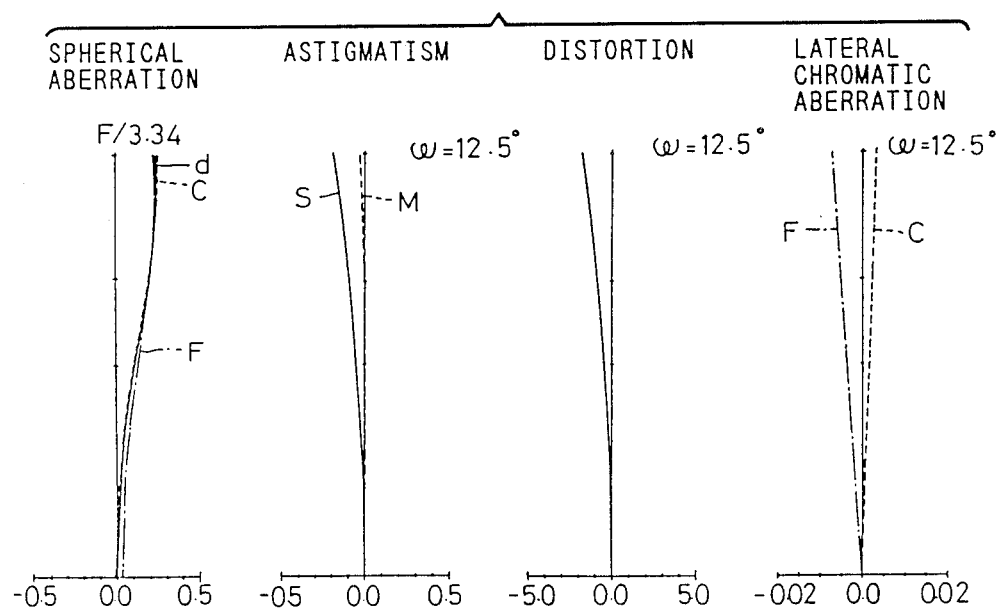

The Embodiment 2 consists of a first lens unit and a second lens unit each of which is designed as a GRIN lens. Further, the plane parallel plate arranged on the image side consists of optical members such as an optical low pass filter and a half mirror. Aberration characteristics at the wide position and the tele position of the Embodiment 2 are illustrated in FIG. 8 and FIG. 9 respectively.

Figure 10:
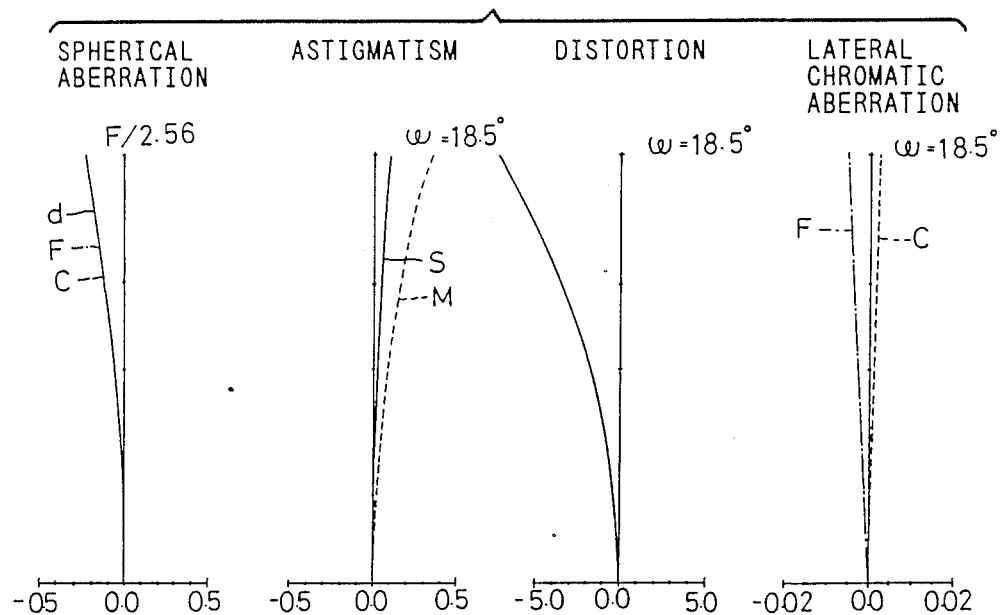
FIG. 10 and FIG. 11 show graphs illustrating aberration characteristics of the Embodiment 3 of the present invention.
Figure 11:
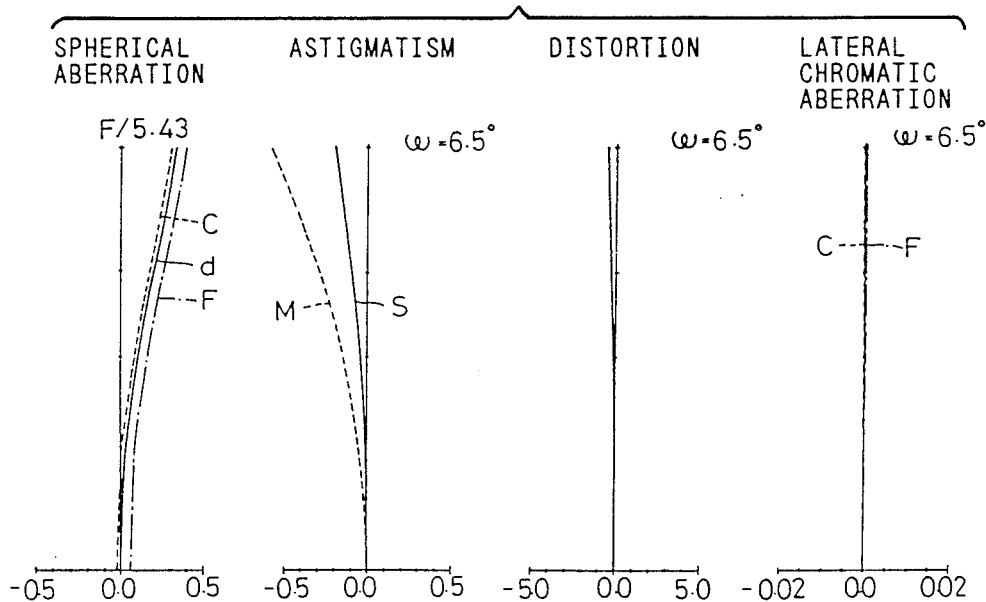

The Embodiment 3 comprises a first lens unit and a second lens unit each of which is designed as a GRIN lens having nearly planar surfaces which are substantially parallel with each other. Aberration characteristics at the wide position and the tele position of the Embodiment 3 are visualized in FIG. 10 and FIG. 11 respectively.

Figure 12:
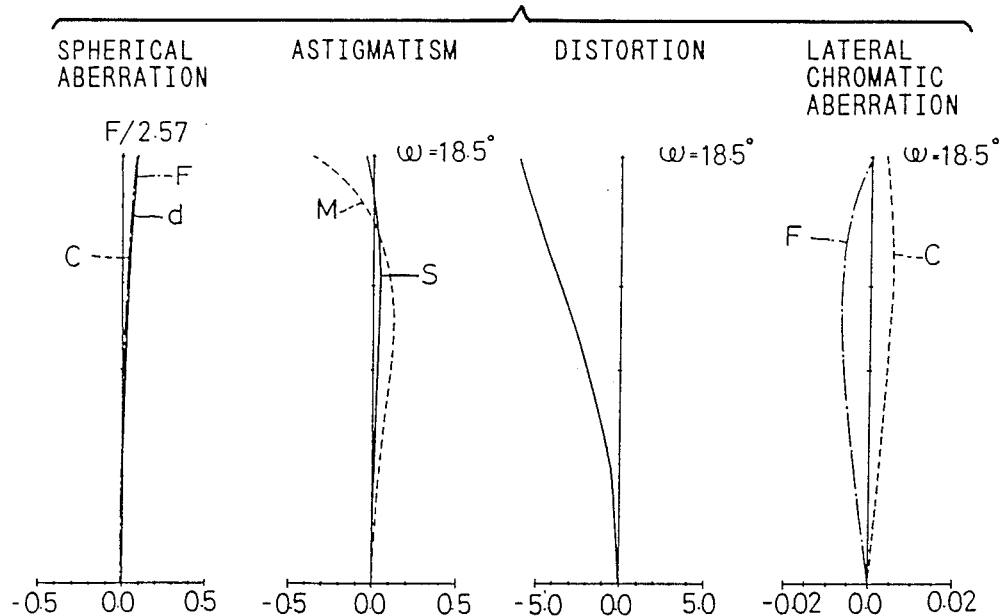
FIG. 12 and FIG. 13 show graphs illustrating aberration characteristics of the Embodiment 4 of the present invention.
Figure 13:
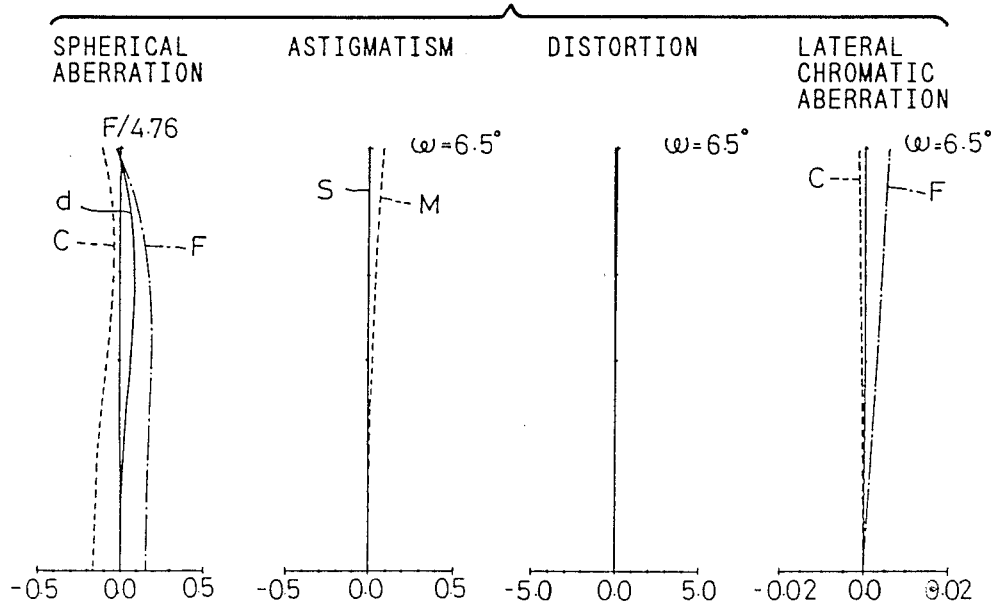

The Embodiment 4 consists of a first lens unit which is composed of a positive lens element made of a homogenous medium and a GRIN lens of a meniscus shape having negative refractive power, and a second lens unit composed of two GRIN lenses. Aberration characteristics at the wide position and the tele position of the Embodiment 4 are illustrated in FIG. 12 and FIG. 13 respectively.

Figure 14:
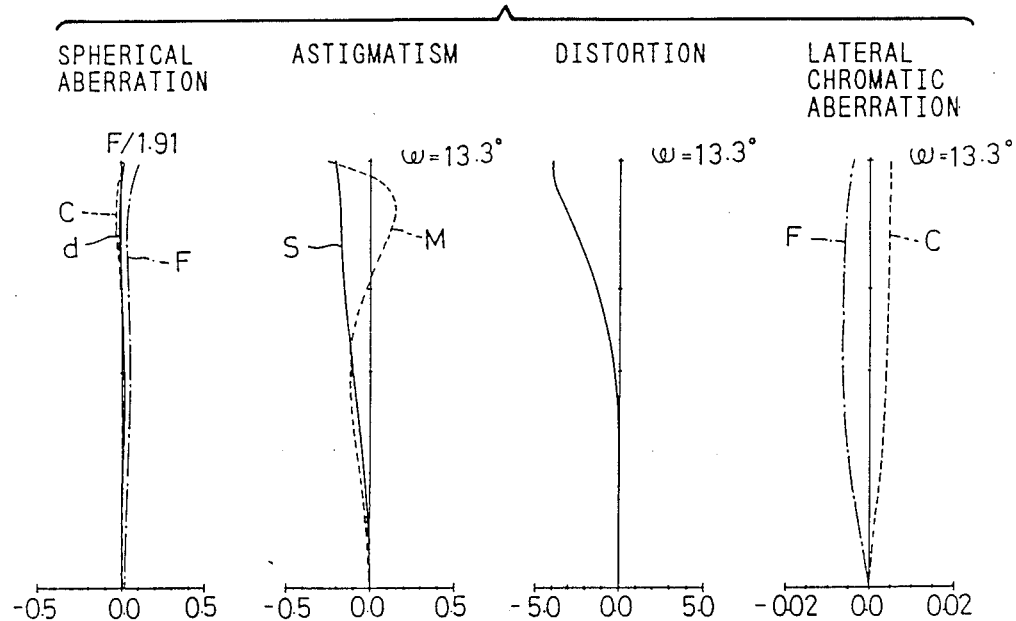
FIG. 14 and FIG. 15 show curves illustrating aberration characteristics of the Embodiment 5 of the present invention.
Figure 15:
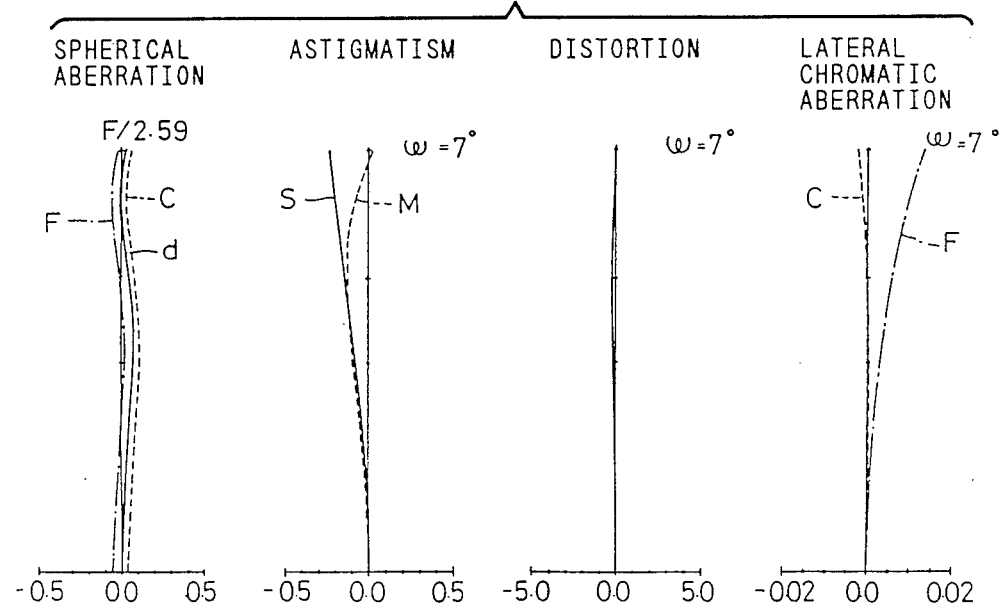

The Embodiment 5 comprises a first lens unit consisting of a negative homogenous lens element having an aspherical surface on the image side and a GRIN lens having negative refractive power. Further, the plane parallel plate arranged on the extremely image side is composed of optical members such as an optical low pass filter and a half mirror. Aberration characteristics at the wide position and the tele position of the Embodiment 5 are visualized in FIG. 14 and FIG. 15 respectively.

In addition, the Embodiment 5 adopts an aspherical surface on the homogenous lens element. When the direction of the optical axis is taken as the x axis and the direction perpendicular to the optical axis is taken as the y axis, shape of the aspherical surface is expressed by the following formula:

$$x = \frac{y^2/r}{1 + \sqrt{1 - (y/r)^2}} + Ey^4 + Fy^6 + Gy^8 + \ldots$$

wherein the reference symbols E, F, G, . . . represent the aspherical surface coefficients.

As is understood from the foregoing description, the zoom lens system according to the present invention comprises a small number of lens elements, especially in the first lens unit thereof, and has favorably corrected offaxial aberrations such as chromatic aberration and distortion which are apt to be produced in the first lens unit and varied remarkably by changing focal length in the ordinary zoom lens system.

I claim:

1. A zoom lens system comprising:
   lens units including a first lens unit having negative refractive power and a second lens unit having positive refractive power disposed in order from the object side with an airspace therebetween, and so adapted as to change focal length thereof by varying at least the airspace reserved between said first lens unit and said second lens unit, said first lens unit comprising at least one GRIN lens expressed by the formula shown below, and said zoom lens system being so structured as to satisfy the following conditions (1) and (2):

$$n(r) = n_0 + n_1 r^2 + n_2 r^4 + \ldots$$

$$n_1(d) > 0 \quad (1)$$

$$0.9 > f_I/f_a > -5 \quad (2)$$

wherein the reference symbol r represents distance as measured from the optical axis in the radical direction, the reference symbol n(r) designates refractive index of a lens portion located at a radial distance of r from the optical axis, the reference symbols $n_0$, $n_1$, $n_2$, . . . denote the coefficients of 0-th, 2-nd, 4-th, . . . order, the reference symbol $n_1(d)$ represents value of the coefficient $n_1$ in refractive index distribution for the d-line, the reference symbol $f_I$ designates focal length of said first lens unit, and the reference symbol $f_a$ denotes focal length of a lens unit composed by replacing said GRIN lens with a lens element having the same shape thereof and made of a homogeneous medium having a refractive index of $n_0$ in the first lens unit.

2. A zoom lens system according to claim 1 wherein said first lens unit is composed of a single GRIN lens.

3. A zoom lens system according to claim 2 wherein both the surfaces of said GRIN lens are nearly planar.

4. A zoom lens system according to claim 1 wherein said second lens unit is composed of a GRIN lens.

5. A zoom lens system according to claim 4 wherein each of the GRIN lenses of the first lens unit and the second lens unit has two nearly planar surfaces.

6. A zoom lens system according to claim 1 wherein said first lens unit is composed of a positive lens element made of a homogenous medium, said GRIN lens having the meniscus shape.

7. A zoom lens system according to claim 6 wherein the image side surface of said positive lens element is and aspherical.

8. A zoom lens system according to claim 1 comprising at least one lens surface which is aspherical.

* * * * *